Figure 1:
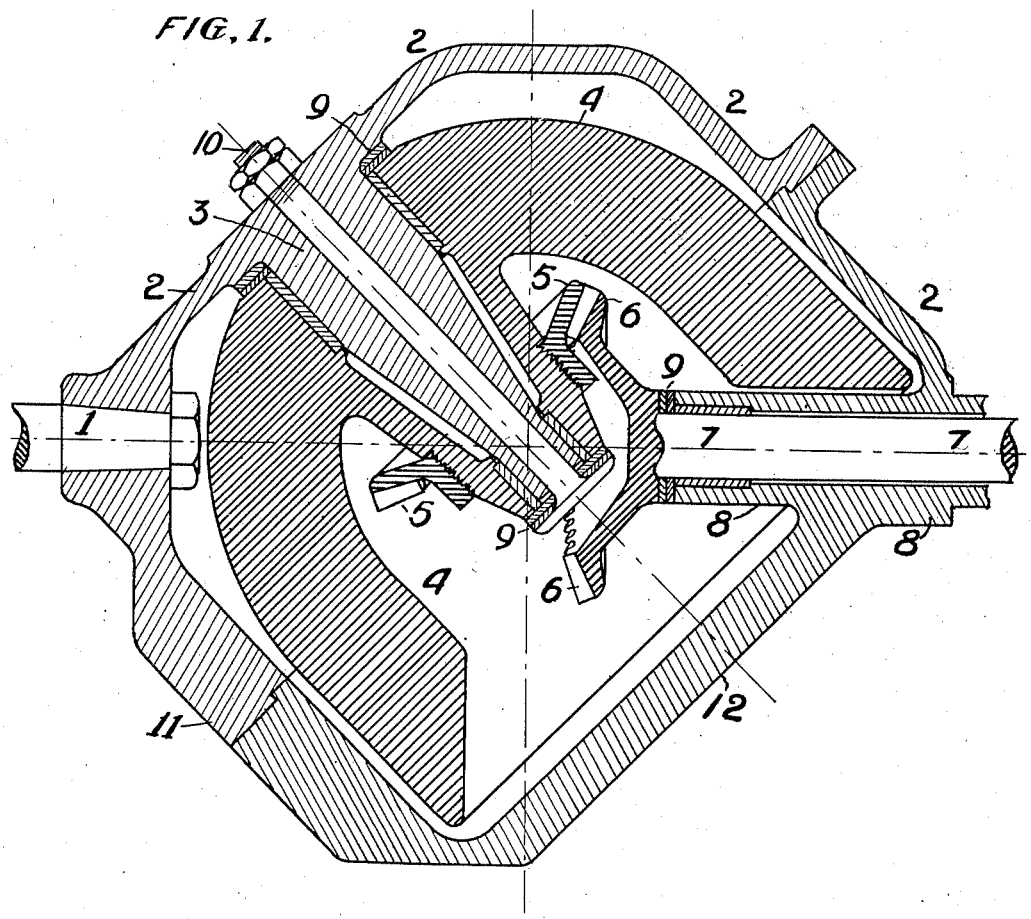

W. HUNT.
ROTARY MECHANISM FOR TRANSMISSION OF POWER AT VARYING SPEEDS.
APPLICATION FILED MAY 8, 1917. RENEWED SEPT. 9, 1920.

1,360,216.

Patented Nov. 23, 1920.
3 SHEETS—SHEET 1.

INVENTOR
WILFRED HUNT
BY Hmom and Hmom
ATTORNEYS

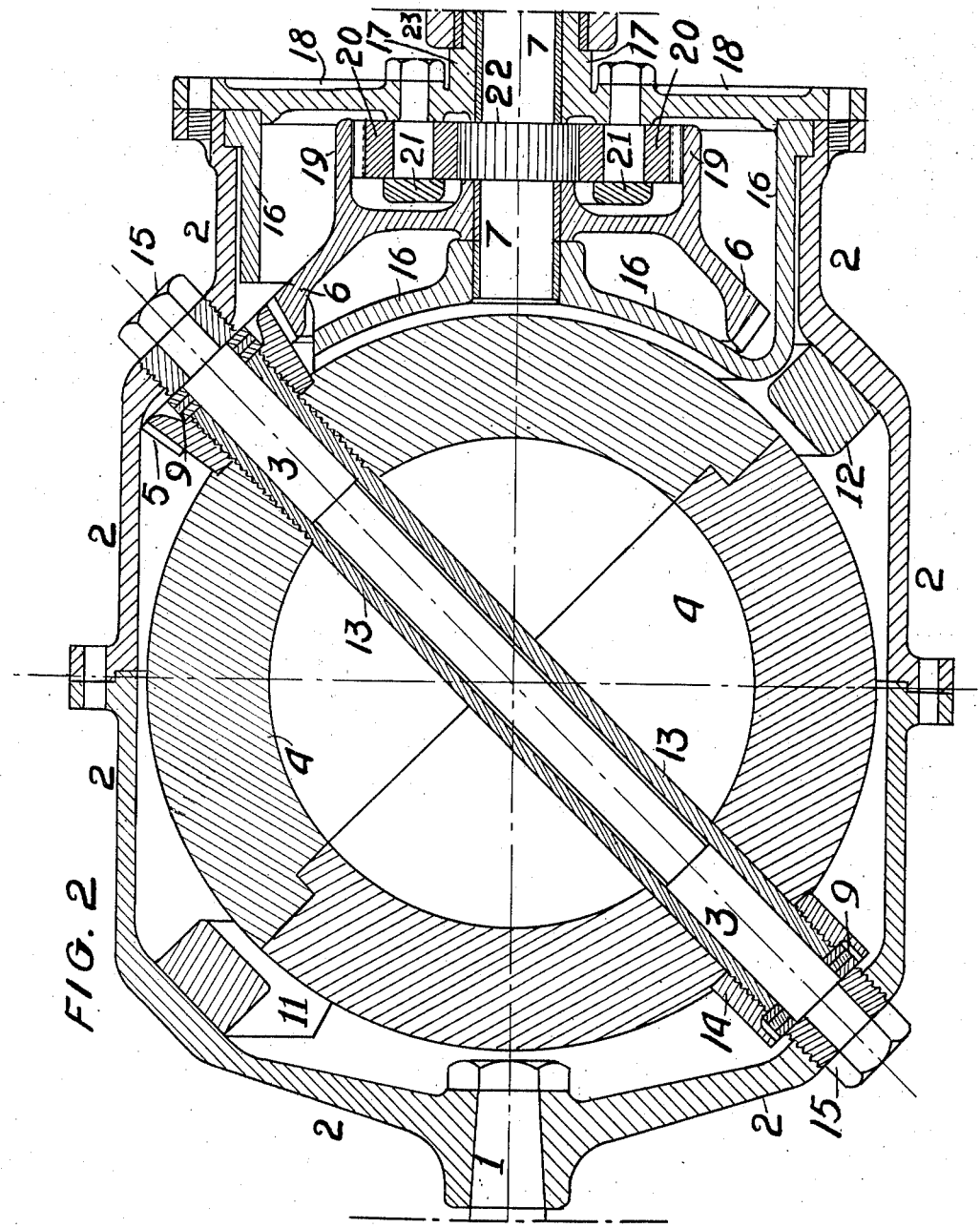

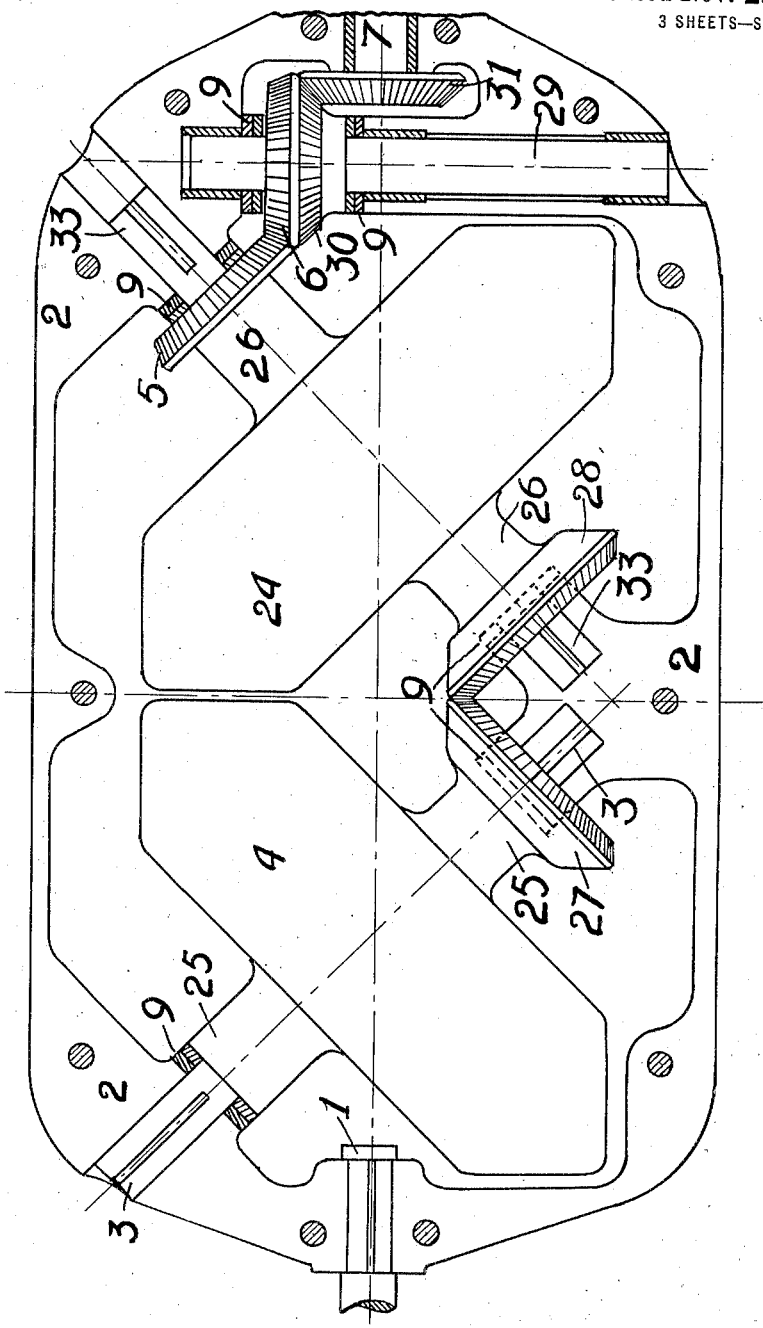

UNITED STATES PATENT OFFICE.

WILFRED HUNT, OF HILLHEAD, GLASGOW, SCOTLAND.

ROTARY MECHANISM FOR TRANSMISSION OF POWER AT VARYING SPEEDS.

1,360,216.      Specification of Letters Patent.     Patented Nov. 23, 1920.

Application filed May 8, 1917, Serial No. 167,242. Renewed September 9, 1920. Serial No. 409,288.

*To all whom it may concern:*

Be it known that I, WILFRED HUNT, a subject of the King of Great Britain and Ireland, and a resident of Hillhead, Glasgow, Scotland, have invented a certain new and useful Rotary Mechanism for the Transmission of Power at Varying Speeds, of which the following is the specification.

The invention relates to the type of mechanism described in the specification of my prior United States Patent No. 1,127,251—dated 2nd February, 1915, and of my application for a United States Patent series of 1915, No. 132,870—filed 22nd November, 1916, and falls broadly within the claims thereof.

The invention has for its object to so improve the construction and action of mechanism of this kind (viz. mechanism in which there is an inertia member so interconnected between the primary and secondary members that its mass is caused to oscillate in accordance with the difference in speed between the primary and secondary members) that completely smooth running, both as regards power input and power output is attained with a single unit. Thus the mechanism is greatly simplified and is rendered much more compact.

In carrying out the invention, the inertia member consists of a single mass which is arranged so that its axis lies at an angle to and with its axis cutting the main axis of rotation, and is rotatable on its axis.

The inertia mass is connected to the secondary member by a gimbal ring pivoted to it and to the member, with the result that power is only transmitted to the member from certain parts of the oscillating mass, owing to the fact that the gimbal ring is quite free to swing on its pivots under impulse from other parts of the mass.

According to the invention; the mass, mounted on its Z-crank, inclined axle, swash-plate or equivalent, is interconnected with the secondary member by a device which equally transmits all the impulses of all parts of the oscillating mass. Now, as there is always a part of that mass in a particular phase,—as it may be expressed, phases travel around the mass as it were—there is a constant absorption of power and a constant transmission of it to the secondary member, and completely smooth running is assured.

Preferably the device connecting the mass with the secondary member consists of toothed gearing.

Besides being constant in its transmission of turning effort from the mass to the secondary member, the device connecting the mass to the secondary member (whatever that device may be) should be such that it and the secondary member rotate together at the same speed and in the same direction—that is to say; they are " geared level " for the same direction of rotation. Put in another way, the mass should oscillate as determined by the relative speed of the primary—that is to say, the difference in speed between the primary and the secondary—but should rotate at the speed of the secondary. As a third explanation of this point, it may be said that the connection between the mass and the secondary should be such that a marked point on the periphery of the mass maintains a mean parallelism with a like marked point on the periphery of the secondary member. I use the expression " mean parallelism " for want of a better brief expression, to indicate that while a given point on the equator of the sphere does not move in a straight line relatively to the secondary member, but in a lemniscate curve, nevertheless the total of its motions is, as one may say, parallel, and it comes back to the same place always.

The mass may be spherical or spheroidal—in which case, complete static and rotatory balance is obtainable. Or the mass may be of flywheel form—approaching more the disk than the sphere—in which case a curious phenomenon is observable. That is to say, if a disk-form mass be balanced for rotation by weights applied diametrically opposite to the points of oblique rotational unbalance; while the mechanism is balanced when it is " running solid "—that is, when primary and secondary speeds are the same— it begins to go out of balance as soon as secondary speed begins to drop, until a maximum of unbalance is reached when secondary is at zero. Conversely, if no weights are applied to correct the oblique unbalance, want of balance is very apparent when secondary speed approaches primary and dies away as secondary speed approaches zero. Therefore, a single disk-form mass cannot be effectively balanced for all speed variations. But if two such masses, oppositely angled, be used, balance is achieved, as one then counteracts the other, While centrifugal force does not affect the moment of a spherical or spheroidal mass, it does that of a disk-form mass—it applies an added moment, disappearing as the ratio of reduction increases.

The improved mechanism fulfills all those conditions set forth in the two prior specifications—namely, the necessary inflexible interconnection of the three members, the similarity of all periods of change of phase, the avoidance of the coincidence of the axes of bodily rotation and of oscillation; and goes further in combining the effect of a plurality of units in one unit.

In the accompanying drawings, which illustrate three different examples of construction embodying the invention, Figures 1 and 2 are longitudinal median sections, and Fig. 3 is a longitudinal elevation, partially in section at the right hand end of the figure.

It is to be understood of course that these three examples are merely illustrative and in nowise limitative of the invention.

In the example shown in Fig. 1, the primary shaft 1 has fixed on it a casing 2 having formed in it a stout diagonal pin 3, the axis of which, inclined at 45 degrees to the axis of bodily rotation, cuts the latter. On this pin 3 is loosely mounted a spheroidal flywheel mass 4. Fixed on the mass 4 is a bevel wheel 5 which gears with a bevel wheel 6 formed on the secondary shaft 7.

The secondary shaft 7 is carried in a sleeve 8 formed on the casing 2. Thrust washers 9 are arranged throughout, and the mass 4 is held in place by a bolt 10 passing through the pin 3. Thickened parts 11, 12, are formed in the casing for balancing purposes, and the casing is supported in any convenient form of fixed bearings—which are not shown. While this example illustrates what is probably the simplest form of the mechanism, it suffers from certain disabilities. For true rotational balance at all speeds and speed-differences, it is necessary that the center of gravity of the mass should coincide with the point of intersection of the axis of the pin 3 with the axis of bodily rotation (that is, the axis of the primary and secondary shafts 1, 7) and also that the moments of gyration about all axes passing through this point should also be equal. With a mass which is not a sphere, actual equality of these is impossible, and the best obtainable for balance is a compromise in which the center of gravity is no farther from this point of intersection than is what may be termed the mean center of the gyratory moments. Moreover, the load is somewhat overhung—an obvious disability from a structural point of view.

It will be seen that the bevel wheels 5 and 6 are of equal size, and that, therefore, the mass and the secondary shaft maintain a mean parallelism with one another.

In the example shown in Fig. 2, the mass 4 is truly spherical. It is formed in halves strung on a sleeve 13 and held thereon between a bevel wheel 5 at one end and a nut 14 at the other. The whole is loosely mounted upon a spindle 3 inclined at 45 degrees to the axis of bodily rotation and secured by nuts 15 in a casing 2 made in halves bolted together and fixed on the primary shaft 1.

The bevel wheel 5, fixed to the spherical mass 4, gears with a bevel wheel 6 mounted loosely on the secondary shaft 7 which shaft 7 is carried at its inner end in a bearing formed in a supplementary casing 16 and, at its outer end, in a sleeve 17 formed on a cover piece 18 bolted to the casing 2 and also holding the supplementary casing 16 in place.

Integrally with the bevel wheel 5, is formed an internally-toothed ring 19. With this toothed ring there gear planetary pinions 20 carried on a spider 21 secured to the cover piece 18. The planetary pinions 21 gear with a final central pinion 22 on the secondary shaft 7. The cover-piece sleeve 17, with the shaft 7 within it, is supported in a stationary bearing 23; the primary shaft 1 being similarly supported in a bearing which is not shown. Washers 9 are arranged to take end-thrust, and balance weights 11, 12 are applied to the casing to balance the spindle 3 and its allied parts.

In this example, the gearing—more complex than that of the foregoing example—gives the same result. That is to say; the ratio of the pinions 5, 6 is three-to-one while the ratio of the internally-toothed ring 19, reversing the motion through the planetary pinions 21, to the pinion 22 of the secondary shaft 7 is one-to-three. Thus the mass 4 and the secondary shaft 7 maintain a mean parallelism as before.

Of course, various other arrangements of gearing or equivalent may be devised for the same purpose.

In the example shown in Fig. 3 there are two masses 4, 24. These approach disk form and are carried on sleeves 25, 26 mounted loosely on shafts 3, 33 fixed in a casing 2 made in longitudinal halves and fixed on the primary shaft 1. The shafts 3, 33 are inclined at 90 degrees to each other and oppositely inclined at 45 degrees to the axis of bodily rotation which also their axes cut. The masses 4, 24 thus balance one another under all conditions. The masses are geared together by bevel wheels 27, 28 fast on their sleeves 25, 26, and the second mass 24 has also on its sleeve 26 a bevel wheel 5 gearing with a bevel wheel 6 on a transverse shaft 29 which has on it a bevel wheel 30 gearing with a bevel wheel 31 on the secondary shaft 7. The shaft 29 is supported in bearings in the casing 2, and its lower end is extended so that the mean center of gravity of it and the pinions on it approximately coincide with the axis of bodily rotation. Thrust washers 9 are provided, and the casing 2 is supported in any convenient form of fixed bearings (which are not shown).

It will be seen that this gearing gives the same results as that in the former examples—and, indeed, the final train is one alternative to that shown in Fig. 2.

What I claim is:—

1. In rotary mechanism for the transmission of power, a primary member, a secondary member, and an interposed nutating inertia transmission mass, operatively interconnected between the same, the interconnecting means between the inertia mass and the secondary member serving to transmit the non-intermittent movement of the mass to the secondary member continuously.

2. In rotary mechanism for the transmission of power, a primary member, a secondary member, and an interposed nutating inertia transmission mass, operatively interconnected between the same, the interconnecting means between the inertia mass and the secondary member serving to maintain a mean parallelism between the inertia mass and the secondary member.

3. In rotary mechanism for the transmission of power, a primary member, a secondary member, and an interposed nutating inertia transmission mass, operatively interconnected between the same, the interconnecting means between the inertia mass and the secondary member serving to transmit the non-intermittent movement of the mass to the secondary member continuously and to maintain a mean parallelism between the inertia mass and the secondary member.

4. In rotary mechanism for the transmission of power, a primary member, a secondary member, and an interposed nutating inertia transmission mass, operatively interconnected between the same, the interconnection means between the inertia mass and the secondary member comprising gears which serve to transmit the non-intermittent movement of the mass to the secondary member continuously.

5. In rotary mechanism for the transmission of power, a primary member, a secondary member, and an interposed nutating inertia transmission mass, operatively interconnected between the same, the interconnection means between the inertia mass and the secondary member comprising gears which serve to maintain a mean parallelism between the inertia mass and the secondary member.

6. In rotary mechanism for the transmission of power, a primary member, a secondary member, and an interposed nutating inertia transmission mass, operatively interconnected between the same, the interconnection means between the inertia mass and the secondary member comprising gears which serve to transmit the non-intermittent movement of the mass to the secondary member continuously and to maintain a mean parallelism between the inertia mass and the secondary member.

7. In a construction such as that specified in claim 1, an inertia mass of spherical or spheroidal shape.

8. In a construction such as that recited in claim 1, a connection between the inertia mass and the secondary member comprising a pinion on the inertia mass, a pinion on the secondary member and between the pinions, a reverse gear, substantially as described.

In testimony whereof I have signed my name to this specification, in the presence of two subscribing witnesses.

WILFRED HUNT.

Witnesses:
 JAMES EAGLESON,
 BETSY LOGAN.